United States Patent [19]

Mayhew

[11] Patent Number: 5,688,065
[45] Date of Patent: Nov. 18, 1997

[54] DOUBLE CARDAN UNIVERSAL JOINT BALL AND SOCKET SEAL

[75] Inventor: Roger D. Mayhew, Fredonia, Wis.

[73] Assignee: Weasler Engineering, Inc., West Bend, Wis.

[21] Appl. No.: 548,222

[22] Filed: Oct. 25, 1995

[51] Int. Cl.⁶ .................. F16C 11/06; F16D 3/16
[52] U.S. Cl. .............. 403/51; 403/54; 277/212 C; 464/116
[58] Field of Search ................ 403/50, 51, 53, 403/54, 134; 277/212 C, 212 FB, 29; 464/906, 112, 116, 173

[56] References Cited

U.S. PATENT DOCUMENTS

| | | | |
|---|---|---|---|
| 1,272,740 | 7/1918 | Wanders | 464/112 |
| 2,584,648 | 2/1952 | Welsh | 464/112 X |
| 3,007,720 | 11/1961 | Breitenstein . | |
| 3,418,828 | 12/1968 | Cams | 464/173 X |
| 3,441,298 | 4/1969 | Herbenar et al. . | |
| 3,451,700 | 6/1969 | Smith . | |
| 3,835,667 | 9/1974 | King et al. | 464/173 X |
| 4,276,759 | 7/1981 | Faulbecker . | |
| 4,639,159 | 1/1987 | Amrath | 403/50 |
| 4,781,662 | 11/1988 | Mayhew et al. | 464/118 X |
| 4,896,988 | 1/1990 | Inoue . | |
| 4,902,157 | 2/1990 | Ishikawa et al. . | |

FOREIGN PATENT DOCUMENTS

| | | | |
|---|---|---|---|
| 602537 | 3/1960 | Italy | 403/134 |

OTHER PUBLICATIONS

Applicant's Exhibit A: 2–page drawing of admitted prior art seal and universal joint assembly incorporating said seal.
Applicant's Exhibit B: Bondioli & Pavesi brochure re 50° Wide Angle Joint, admitted prior art.
Applicant's Exhibit C: Selected background materials re double Cardan universal joints by E.R. Wagner, P.E., Saginaw Steering Gear Div., GMC, admitted prior art.

*Primary Examiner*—Anthony Knight
*Attorney, Agent, or Firm*—Quarles & Brady

[57] ABSTRACT

An elastomeric seal for a ball and socket centering apparatus of a double cardan constant velocity universal joint has slits radiating from a hole in which the ball is received which create fingers that flex to wipe against the ball and retain grease in the seal as the joint is rotated through an angle.

5 Claims, 1 Drawing Sheet

5,688,065

DOUBLE CARDAN UNIVERSAL JOINT BALL AND SOCKET SEAL

BACKGROUND OF THE INVENTION

1. Field of the Invention

This invention relates to seals for the ball and socket centering apparatus of a double cardan universal joint.

2. Discussion of the Prior Art

In a typical double cardan or constant velocity universal joint, two outer yokes are connected to a center yoke by crosses and the two outer yokes are connected to one another by a centering apparatus which includes one or more ball and socket joints. At higher rotational speeds, say above 2000 rpm, it has been found that the joint between a ball and socket needs lubrication to have a reasonable working life.

A typical bellows type of seal for the ball and socket of a constant velocity universal joint is disclosed in U.S. Pat. No. 4,276,759. In this type of seal, both ends of the seal are secured to relatively moving parts of the centering apparatus and neither end wipes on the ball of the centering apparatus. At high speeds, if the lubricant is concentrated on one side of the bellows type of seal, the seal will move radially due to centrifugal force and the seal will ultimately fail. Therefore, the best seal design for high speeds should have a minimum radius or diameter to attenuate undesirable centrifugal forces and should be rigid enough to withstand the centrifugal forces which inevitably do result.

Another previous solution has been to use a bellows type seal but in which the smaller diameter of the seal wipes against the ball or against the base of the ball. However, with a double cardan universal joint, the motion of the ball relative to the socket as the CV joint is flexed through an angle has an axial component. The import of this is that the sealing surface of the seal, if it is restrained against movement relative to the socket, changes in diameter. If the sealing surface diameter is constant, then the seal has to move axially. A problem with these types of seals is that at higher rotational speeds, for example 3,000 rpm at an angle of about 15° or more, the constant flexing of the seal (2 times per revolution) can cause heating in the elastomer of the seal and ultimate failure. Also, the center yoke size must be kept at a minimum length in a universal joint for practical and functional reasons, so space is at a premium inside the universal joint.

SUMMARY OF THE INVENTION

The present invention provides a seal which keeps the flexing of the elastomer to a minimum at higher angles in order to keep the heat build-up in the elastomer to a minimum. The seal of the invention is mounted on the socket in the usual manner. However, the seal of the invention fits close to the neck of the ball in order to have the smallest radius and, as the ball moves axially, the inside diameter of the seal is required to change in diameter, and may also change shape by becoming more elliptical or elongated. In order to accommodate these changes, the inside diameter of the seal has at least one slit formed around it. This allows the seal sections to follow the ball and wipe the grease on the ball to keep it on the socket side of the seal.

In preferred aspect, multiple slits are provided which extend radially to define fingers between them which are hingedly biased against the ball. Preferably, a ridge surrounds the hole on a socket side of the hole and the slit extends through the ridge. The ridge acts to wipe grease back on the ball as the ridge is biased against the ball by the finger.

In another preferred aspect, the seal is generally cup shaped, having an outside diameter at said one end and the hole at the other end being of a smaller diameter. The shape of the seal preferably conforms to the shape of the socket which the seal overlies, with a face of the seal in which the hole is formed being against an axial face of the socket. Thereby, the seal is not susceptible to grease accumulating in open pockets of the seal or localized areas of it, thereby avoiding subjecting the seal to the centrifugal forces which can stretch and fatigue it into failure.

These and other objects and advantages of the invention will be apparent from the detailed description and drawings.

DETAILED DESCRIPTION OF THE PREFERRED EMBODIMENTS

Figure 1:
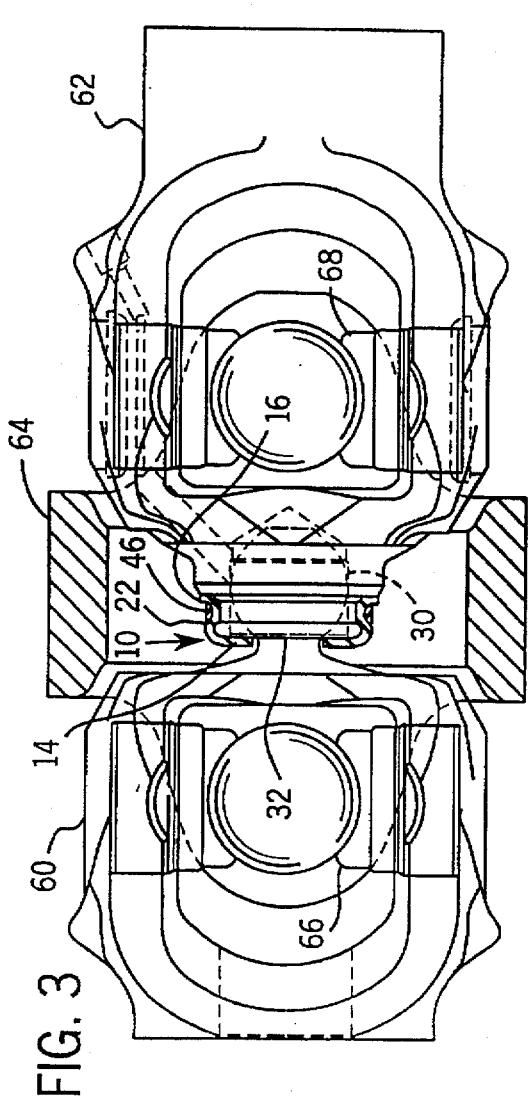
FIG. 1 illustrates a front plan view of a seal incorporating the invention.
Figure 2:
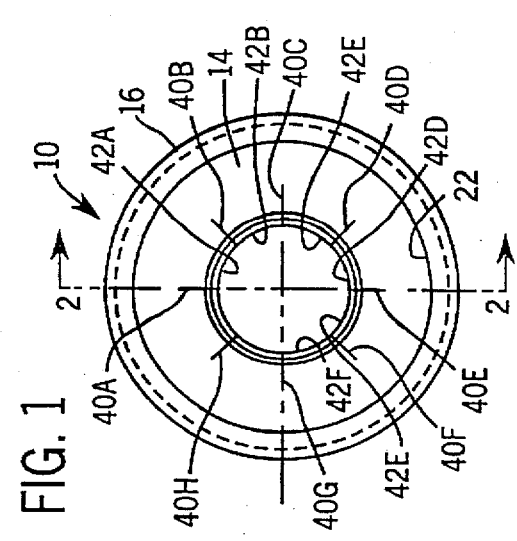
FIG. 2 illustrates a side plan view partially in section of the seal of FIG. 1.

FIGS. 1 and 2 illustrate a seal 10 of the invention by itself, without having been assembled to a constant velocity universal joint. The seal 10 is generally cup shaped having been formed from a single piece of elastomeric material.

The seal 10 has an outside diameter end 12 which is axially spaced from its inside diameter end 14. A flange 16 surrounds the outside diameter end 12 and a ridge 18 surrounds hole 20 in the inside diameter end 14 on the socket side of the end 14. A generally cylindrical intermediate section 22 joins the ends 12 and 14, with a radiused corner 24 joining the end 14 to the intermediate section 22. The hole 20 is generally conical (as seen at the end 43 of finger 42A in FIG. 2) at an angle of about 15 degrees to horizontal and tapering outwardly in the direction toward the larger diameter end 12. As such, the intersection of the hole 20 with the ridge 18 forms an edge 26 which is positively raked against the ball so as to wipe grease off of the ball 30 back toward the socket 32.

Radiating from the hole 20 equiangularly spaced at 45° are 8 slits 40A-H, which are each approximately 0.180 inches long in the preferred embodiment. As used herein, "radiating" means that they emanate radially from the hole 20. The slits 40A-H lend flexibility to the material of the seal 10 around the hole 20 and relieve the hole 20 from stretching circumferentially to accommodate movements of the ball 30 relative to the socket 32. Rather than stretching, the fingers 42A-H defined between the slits 40A-H can hinge about the base of the adjacent slits 40A-H which define those fingers to remain in contact with the ball 30 through the entire range of motion of the ball 30 relative to the socket 32. The material of the seal 10 is sufficiently stiff and resilient to bias the fingers 42A-H against the ball. As such, the surface of the ball 30 which is rotating out of the socket 32 is wiped by the edge 26 on the respective finger 42A-H which is sliding against the exiting surface of the ball 30, to retain the grease on that surface inside of the seal 10.

This wiping motion is not perfect so that occasionally grease does have to be replenished to the seal 10. This can be accomplished via the lubrication system of the joint, for example as more specifically described in U.S. Pat. No.

4,781,662, the disclosure of which is hereby incorporated by reference. However, the seal does maintain the ball and socket seal lubricated for useful periods at high speed.

Figure 3:
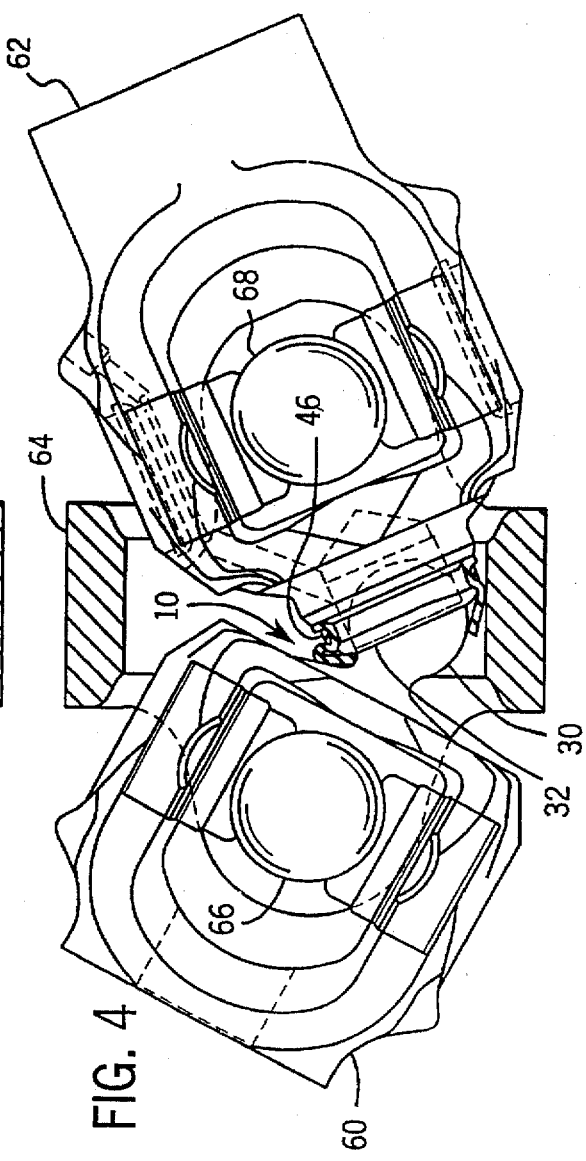
FIG. 3 illustrates a double cardan joint incorporating a seal of the invention in a straight position.
Figure 4:
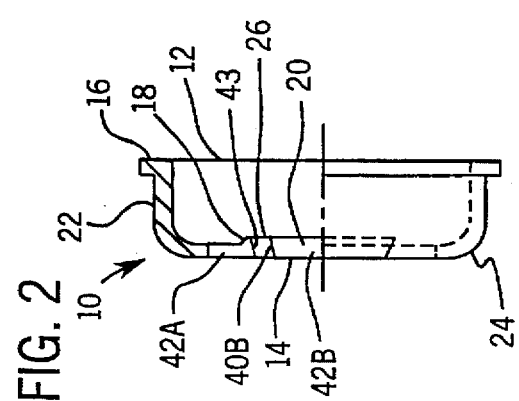
FIG. 4 illustrates the joint of FIG. 3 in an angled position.

FIGS. 3 and 4 illustrate a seal 10 of the invention assembled in a double universal joint. Briefly, the joint includes outer yokes 60 and 62 which are journalled to a center yoke 64 by respective crosses 66 and 68. Ball 30 of yoke 60 slides in socket 32 of yoke 62 to keep the yokes 60 and 62 equiangular relative to the center yoke 64. Details of a universal joint similar to this one are described in the aforementioned U.S. Pat. No. 4,781,662. It should, however, be understood that the seal 10 could be applied to the ball and socket joint in other types of universal joints.

The outside diameter end 12 is secured to the socket 32 by any suitable means, for example, a spring retaining band 46. The band 46 compresses the portion of sleeve 22 adjacent to flange 16 down into an external groove defined on the socket 32. This creates a fluid tight connection between the seal 10 and the socket 32, while flange 16 helps prevent the seal 10 from sliding axially under the band 46.

End 14 lays flat against the axial face of socket 32 with hole 20 adjacent to the neck portion of the ball 30 and edge 26 contacting the ball 30. In the position shown in FIG. 3, fingers 42A-E are preferably relaxed, and all lay in the plane of the end 14. When the joint is made to assume an angle, for example as in FIG. 4, the fingers 42A-H flex independently of one another so as to accommodate the movement of the ball 30 relative to the socket 32, as shown in FIG. 4. This movement changes the size and shape of the line on the ball 30 where sealing with the seal 10 takes place. However, the seal 10 stays in contact with the ball 30 without stretching along the periphery of the hole 20.

Preferably, the seal 10 is made from neoprene with a hardness of 60 durometer shore A. The wall thickness of the seal 10 is preferably nominally 0.060 inches, and the height of the ridge 18 is preferably nominally 0.031 inches.

Many modifications and variations to the preferred embodiment will be apparent to those school in the art. For example, more or less than 8 slits could be provided in a seal of the invention, and depending upon the application, the seals need not be directed along perfectly radial lines. Thus, the invention should not be limited to the embodiment described, but should be defined by the claims which follow.

I claim:

1. In an elastomeric seal for a ball and socket centering apparatus of a double cardan constant velocity universal joint of the type which has one end secured to said socket and an opposite end adjacent said ball, said opposite end having a wall with a hole formed therein for receiving said ball, the improvement wherein radially extending slits are provided in said wall of said elastomeric seal around said hole extending from said hole for a distance into said seal, said slits defining between them fingers which wipe against said ball.

2. The improvement of claim 1, wherein 8 equiangularly spaced slits radiate from said hole.

3. The improvement of claim 1, wherein a ridge surrounds said hole on a socket side of said hole and said slits extend through said ridge.

4. The improvement of claim 1, wherein said seal is generally cup shaped having an outside diameter at said one end and wherein said hole is of a diameter less than said outside diameter.

5. The improvement of claim 4, wherein the shape of said seal conforms to the shape of said socket which said seal overlies, with said wall of said seal in which said hole is formed being against an axial face of said socket.

* * * * *